Nov. 11, 1924.
S. G. DOWN
1,514,689
AUTOMOTIVE BRAKE
Filed Feb. 9, 1923
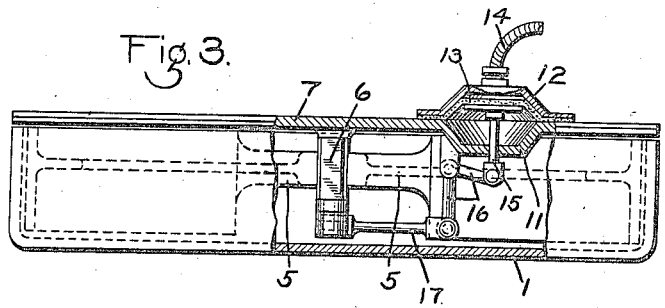
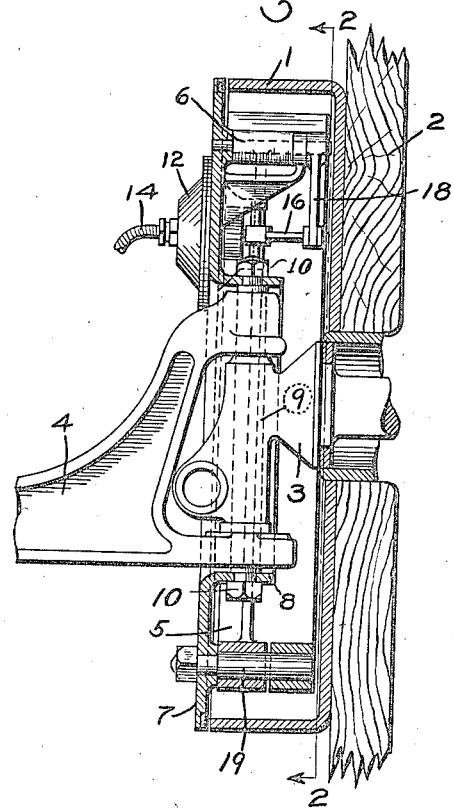
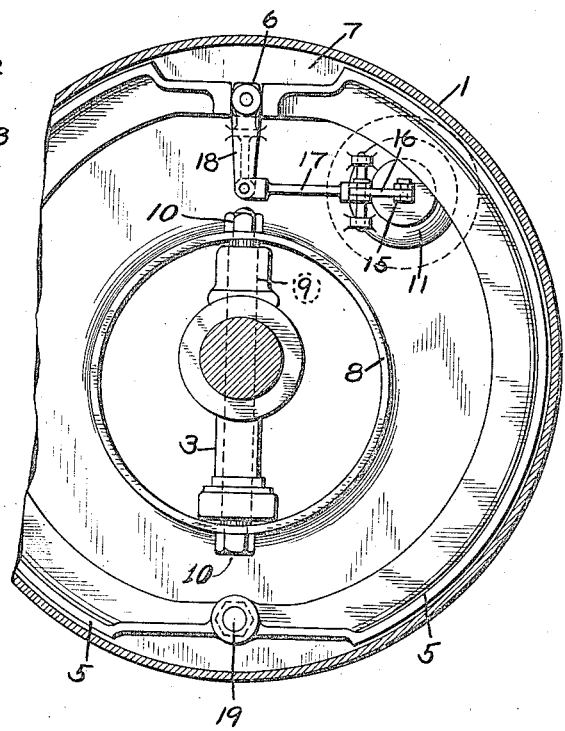
INVENTOR
SIDNEY. G. DOWN
BY Wm. M. Cady
ATTORNEY Patented Nov. 11, 1924.

1,514,689

UNITED STATES PATENT OFFICE.

SIDNEY G. DOWN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE.

Application filed February 9, 1923. Serial No. 618,161.

*To all whom it may concern:*

Be it known that I, SIDNEY G. DOWN, a citizen of the United States, residing at Pittsburgh, in the county of Allegheny and State of Pennsylvania, have invented new and useful Improvements in Automotive Brakes, of which the following is a specification.

This invention relates to automotive brakes and more particularly to a fluid pressure brake construction for the front wheel of a motor vehicle.

The principal object of my invention is to provide an improved brake construction of the above character.

In the accompanying drawing; Fig. 1 is a central vertical section of a brake mechanism applied to the front wheel of a motor vehicle and embodying my invention; Fig. 2 a section on the line 2—2 of Fig. 1; and Fig. 3 a plan view thereof, partly broken away to show the interior of the brake drum.

As shown in the drawing, a brake drum 1 of the internal expanding type is applied to the front wheel 2 of a motor vehicle, the front wheel being supported by the usual steering knuckle 3 which is mounted between bearings in the front axle 4. Brake members 5 are mounted within the drum 1 and are adapted to frictionally engage the drum when said members are expanded by the operation of the cam 6.

A drum cover plate 7 is provided having a central opening for receiving the yoke end of the axle 4, the plate being formed with an annular flange 8 to provide the central opening and said flange serving as a supporting means for the cover plate. For this purpose, the plate 7 is apertured at diametrically opposite points to receive the opposite ends of the knuckle pin 9, the flange being secured in position when the knuckle pin nuts 10 are screwed home.

A fluid pressure brake chamber is associated with the cover plate 7 and preferably the non-pressure head 11 of the brake chamber is formed as an integral part of the plate, while the pressure head consists of a cap section 12 adapted to be secured to the non-pressure head with a flexible diaphragm 13 interposed between the heads. Fluid under pressure is supplied to the pressure head of the brake chamber through a flexible hose 14 and the flexible diaphragm 13 is adapted to operate a diaphragm rod 15 when fluid is supplied to the diaphragm.

The rod 15 is pivotally connected to the end of one arm of a bell crank 16, the end of the other arm being pivotally connected to a link 17. Said link is pivotally connected to one end of a lever 18, which lever is adapted to operate the cam 6.

At a point diametrically opposite the cam 6, the brake members 5 are pivotally supported by a pin 19, secured to the cover plate 7.

In operation, when it is desired to effect an application of the brakes, fluid under pressure is supplied through pipe 14 to the brake chamber and the flexible diaphragm 13 is then moved outwardly, causing the diaphragm rod 15 to rock the bell crank 16. The cam lever 18 is then rotated through the connecting link 17, so as to rotate the cam 6 and thus effect the expansion of the brake members 5. The brakes are thus applied by the frictional engagement of the brake members 5 with the drum 1.

The above described construction is so designed that the brake drum cover plate and the associated brake chamber are held in position by the usual nuts of the usual steering knuckle pivot pin, so that it is not necessary to make any change in or addition to the usual front wheel construction for the purpose of providing a supporting means for the brake chamber and the brake drum cover plate.

Having now described by invention, what I claim as new and desire to secure by Letters Patent, is:—

1. In an automotive brake, the combination with the front wheel of a motor vehicle and a steering knuckle for said wheel having a pivot pin and clamping nuts for said pin, of a brake drum associated with said wheel and a cover plate for said drum having a brake chamber associated therewith and provided with portions adapted to be applied to said pivot pin and clamped in position by said nuts.

2. In an automotive brake, the combination with the front wheel of a motor vehicle and a steering knuckle for said wheel having a pivot pin and clamping nuts for said pin, of a brake drum associated with said wheel and a cover plate for said drum having a brake chamber associated therewith and provided with a flange through which said pivot pin extends, said flange and thereby the cover plate being held in position by said nuts.

In testimony whereof I have hereunto set my hand.

SIDNEY G. DOWN.